(No Model.)
W. F. ZIEGLER.
FRUIT PICKER
No. 338,010. Patented Mar. 16, 1886.
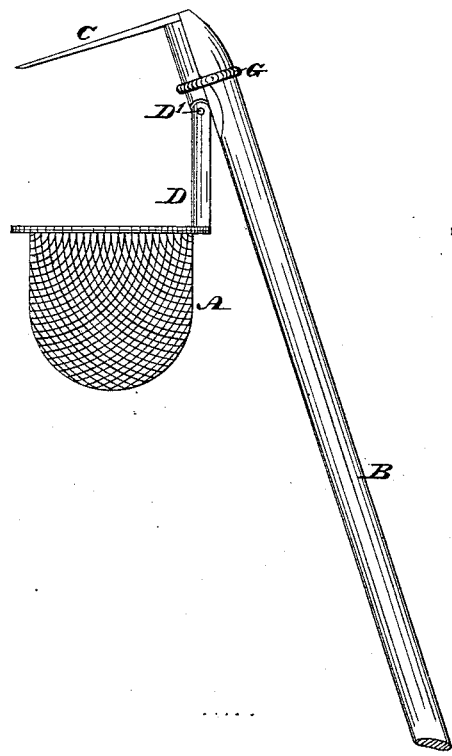
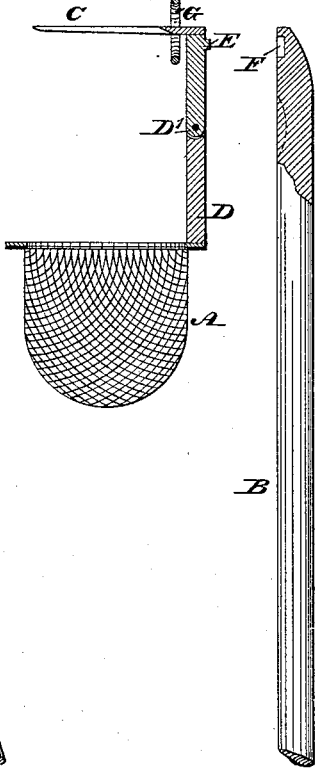
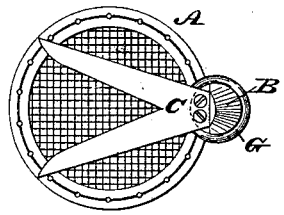
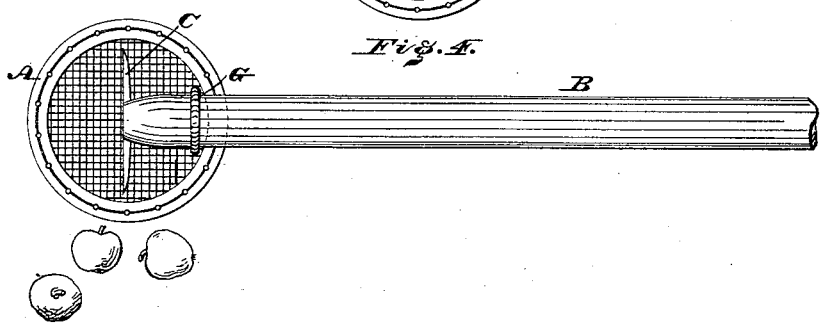
WITNESSES:
INVENTOR:
BY
ATTORNEY.

UNITED STATES PATENT OFFICE.

WILLIAM F. ZIEGLER, OF LONG SWAMP, PENNSYLVANIA.

FRUIT-PICKER.

SPECIFICATION forming part of Letters Patent No. 338,010, dated March 16, 1886.

Application filed August 27, 1885. Serial No. 175,436. (No model.)

*To all whom it may concern:*

Be it known that I, WILLIAM F. ZIEGLER, a citizen of the United States, residing in Long Swamp, county of Berks, State of Pennsylvania, have invented a new and useful Improvement in Fruit-Pickers, which improvement is fully set forth in the following specification and accompanying drawings, in which—

Figure 1 represents a side elevation of a fruit-picker embodying my invention. Fig. 2 represents a partial side elevation and partial vertical section, the basket portion of the picker and the handle thereof being separated. Fig. 3 represents a top or plan view thereof. Fig. 4 represents a side elevation of the picker in position to be overturned laterally to discharge the fruit.

Similar letters of reference indicate corresponding parts in the several figures.

My invention consists of a fruit-picker constructed to admit of the employment of long and short handles, and having a basket which retains its upright position during the inclination of the handle, and possessing other advantages, as will be hereinafter fully set forth.

Referring to the drawings, A represents the basket of a fruit-picker, and B the handle thereof. C represents a knife or cutter, which is of the form of a crotch or fork sharpened on its inner edges, it being noticed that the basket is beneath said cutter. The basket is attached to the lower end of a jointed arm, D, and the cutter to the upper end thereof, said upper end being attached to the handle B, it being seen that the basket is hinged or pivoted to the handle, owing to the joint D' of the arm D. When the cutter is presented to the stem of the fruit, it is pressed thereagainst, so as to cut the stem, or pulled so as to break it, the fruit dropping into the basket. During the manipulations of the picker the inclinations of the handle are not imparted to the basket, as the latter moves on its hinge or pivot D', and thus preserves an upright position, preventing loss of the fruit. The picker may be turned laterally and horizontally, as in Fig. 4, so as to overturn the basket and discharge the contents thereof.

As handles of different lengths may be required for the picker, the arm D is made removable from the handle, so that a handle of the desired length may be employed.

In order to connect the arm with the handle, the former has a teat or lug, E, and the latter an opening, F, to receive said teat, or vice versa. A ring, G, is slipped over the upper end of the arm and adjacent part of the handle, thus clamping or binding said parts and firmly connecting the handle and basket. By sliding the ring clear of the arm and handle the parts are separated (see Fig. 2) and the ring prevented from being lost, owing to the cutter and basket being at the opposite ends of the arm.

Having thus described my invention, what I claim as new, and desire to secure by Letters Patent, is—

1. In a fruit-picker, the handle B, with the recess F therein, in combination with the arm having a lug, and the clamping-ring G, substantially as and for the purpose set forth.

2. In a fruit-picker, the jointed arm D, having the handle B removably attached to the upper joint of said arm D, and having a basket secured to the lower joint of the said arm, substantially as and for the purpose set forth.

3. A handle, in combination with a jointed or hinged arm having a cutter and basket at opposite ends thereof, and a clamping-ring, substantially as and for the purpose set forth.

WILLIAM F. ZIEGLER.

Witnesses:
JOHN A. WIEDERSHEIM,
JNO. K. PLITT.